United States Patent
Choi et al.

(10) Patent No.: US 10,459,288 B2
(45) Date of Patent: Oct. 29, 2019

(54) BACKLIGHT UNIT AND HOLOGRAPHIC DISPLAY DEVICE INCLUDING THE SAME

(71) Applicant: SAMSUNG ELECTRONICS CO., LTD., Suwon-si (KR)

(72) Inventors: Chilsung Choi, Suwon-si (KR); Sunil Kim, Seoul (KR); Geeyoung Sung, Daegu (KR); Hoon Song, Yongin-si (KR); Jungkwuen An, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/704,193

(22) Filed: Sep. 14, 2017

(65) Prior Publication Data
US 2018/0173057 A1     Jun. 21, 2018

(30) Foreign Application Priority Data

Dec. 21, 2016    (KR) ........................ 10-2016-0175836

(51) Int. Cl.
*G02B 5/32* (2006.01)
*G02F 1/1335* (2006.01)
(Continued)

(52) U.S. Cl.
CPC ......... *G02F 1/133602* (2013.01); *G02B 5/32* (2013.01); *G02B 6/0026* (2013.01);
(Continued)

(58) Field of Classification Search
CPC ...... G02B 5/32; G02B 6/0011; G02B 6/0023; G02F 1/133553; G02F 1/133602;
(Continued)

(56) References Cited

U.S. PATENT DOCUMENTS 5,151,800 A  *   9/1992   Upatnieks .......... G02B 27/0944
                                                                             359/14
7,220,021 B2     5/2007   Wang et al.
(Continued)

FOREIGN PATENT DOCUMENTS

JP          2010103060 A     5/2010
KR     10-2014-0115687 A    10/2014
(Continued)

OTHER PUBLICATIONS

Communication dated May 2, 2018, from the European Patent Office in counterpart European Application No. 17209144.9.
(Continued)

*Primary Examiner* — William R Alexander
*Assistant Examiner* — Balram T Parbadia
(74) *Attorney, Agent, or Firm* — Sughrue Mion, PLLC

(57) ABSTRACT

Provided is a backlight unit having high optical efficiency and a holographic display device including the backlight unit. The backlight unit includes a light source unit configured to provide a light beam, a first beam expander configured to mix the light beam provided from the light source unit, expand the light beam in a first direction, and output the mixed and expanded light beam as white light, and a second beam expander configured to expand the white light output from the first beam expander in a second direction perpendicular to the first direction and output the expanded white light as surface light.

26 Claims, 7 Drawing Sheets

(51) Int. Cl.
*G06F 3/01* (2006.01)
*G03H 1/22* (2006.01)
*F21V 8/00* (2006.01)

(52) U.S. Cl.
CPC .. *G02F 1/133553* (2013.01); *G02F 1/133615* (2013.01); *G02F 1/133621* (2013.01); *G03H 1/22* (2013.01); *G03H 1/2286* (2013.01); *G03H 1/2294* (2013.01); *G06F 3/013* (2013.01); *G02B 6/0031* (2013.01); *G02B 6/0053* (2013.01); *G03H 2001/2242* (2013.01); *G03H 2001/2292* (2013.01); *G03H 2001/2297* (2013.01); *G03H 2210/30* (2013.01); *G03H 2222/18* (2013.01); *G03H 2223/16* (2013.01); *G03H 2223/23* (2013.01); *G03H 2226/05* (2013.01)

(58) Field of Classification Search
CPC ........ G02F 1/133615; G02F 1/133621; G03H 1/22; G03H 1/2286; G03H 1/2294; G03H 2001/2242; G03H 3/013; G03H 2001/2292; G03H 2001/2297; G03H 2210/30; G03H 2222/18; G03H 2223/16; G03H 2223/23; G03H 2226/05; G03H 1/04
See application file for complete search history.

(56) References Cited

U.S. PATENT DOCUMENTS

| | | | |
|---|---|---|---|
| 9,332,280 B2 | 5/2016 | Han et al. | |
| 9,368,052 B2 | 6/2016 | Kroll et al. | |
| 9,395,690 B2 | 7/2016 | Futterer | |
| 9,658,378 B2 * | 5/2017 | Song | G02B 5/32 |
| 2004/0012832 A1 | 1/2004 | Gallen et al. | |
| 2006/0114674 A1 | 6/2006 | Wang et al. | |
| 2007/0053030 A1 * | 3/2007 | Hoshino | G02B 5/0252 359/15 |
| 2009/0201669 A1 * | 8/2009 | Hamada | G02F 1/133603 362/97.3 |
| 2013/0170004 A1 * | 7/2013 | Futterer | G02B 6/0046 359/9 |
| 2013/0194644 A1 * | 8/2013 | Cable | G03H 1/2205 359/9 |
| 2015/0085331 A1 | 3/2015 | Chae | |
| 2015/0253487 A1 | 9/2015 | Nichol et al. | |
| 2015/0378080 A1 * | 12/2015 | Georgiou | G02B 5/32 349/62 |
| 2016/0065955 A1 | 3/2016 | Kim et al. | |
| 2016/0147003 A1 | 5/2016 | Morozov et al. | |
| 2016/0255338 A1 | 9/2016 | Song et al. | |
| 2018/0032030 A1 | 2/2018 | Kim et al. | |

FOREIGN PATENT DOCUMENTS

| | | |
|---|---|---|
| KR | 10-2015-0033501 A | 4/2015 |
| KR | 10-2016-0026570 A | 3/2016 |
| KR | 10-2018-0012058 A | 2/2018 |
| WO | 0231405 A2 | 4/2002 |

OTHER PUBLICATIONS

Communication dated Sep. 25, 2018, from the European Patent Office in counterpart European Application No. 17209144.9.

* cited by examiner

BACKLIGHT UNIT AND HOLOGRAPHIC DISPLAY DEVICE INCLUDING THE SAME

CROSS-REFERENCE TO RELATED APPLICATION

This application claims priority from Korean Patent Application No. 10-2016-0175836, filed on Dec. 21, 2016, in the Korean Intellectual Property Office, the disclosure of which is incorporated herein in its entirety by reference.

BACKGROUND

1. Field

The present disclosure relates to a backlight unit and a holographic display device including the same.

2. Description of the Related Art

In related art three-dimensional (3D) systems, techniques using glasses and techniques without glasses are widely used in implementing the 3D images. The techniques using glasses include a polarized glasses technique and a shutter glasses technique, and the techniques without glasses include a lenticular technique and a parallax barrier technique. These techniques use binocular parallax between two eyes, have a limitation in terms of an increase in the number of points of sight, and cause viewer fatigue due to disparity between a sense of depth perceived in the brain and the focus of the eyes.

Recently, 3D systems having a holographic display technique has been commercialized as a 3D image display technique in which full parallax is provided and the sense of depth perceived in the brain and the focus of the eyes match each other. The holographic display technique uses a principle in which if a reference light is irradiated for diffraction to a hologram pattern obtained by interference between light reflected from an original object and the reference light, then an image of the original object is reproduced. The currently commercialized holographic display technique provides a computer-generated hologram (CGH) as an electrical signal to a spatial light modulator, instead of directly exposing the original object to light. As the spatial light modulator forms a hologram pattern according to the input CGH signal and diffracts the reference light, a 3D image may be generated.

However, to implement a complete holographic display technique, a high-resolution spatial light modulator and a large amount of data throughput are required. Recently, to alleviate data throughput and resolution conditions, a binocular hologram technique has been proposed which provides a holographic image only in a viewing zone corresponding to each of the eyes of a viewer. For example, a holographic image having a viewpoint corresponding to a left-eye viewing zone of the viewer and a holographic image having a viewpoint corresponding to a right-eye viewing zone of the viewer may be generated and provided to the left eye and the right eye of the viewer, respectively. In this case, it is unnecessary to generate holographic images having other viewpoints, and thus data throughput may be largely reduced and the resolution condition of the spatial light modulator may be satisfied even in a currently commercialized display device.

SUMMARY

The present disclosure provides a backlight unit for a binocular holographic display device and the binocular holographic display device including the backlight unit.

Additional aspects will be set forth in part in the description which follows and, in part, will be apparent from the description, or may be learned by practice of the presented embodiments.

According to an aspect of an embodiment, there is provided a backlight unit comprising: a light source configured to provide a light beam; a first beam expander configured to: mix the light beam provided from the light source, expand the light beam in a first direction, and output the mixed and expanded light beam as white light; and a second beam expander configured to: expand the white light emitted from the first beam expander in a second direction perpendicular to the first direction, and output the expanded white light as surface light.

The first beam expander may comprise a grating element comprising a plurality of grooves arranged along a third direction inclined with respect to the first direction, each of the plurality of grooves having a wedge shape.

Each of the plurality of grooves may be a prism shape having a height in the second direction.

At least one of an interval between a first groove and a second groove, among the plurality of grooves, and an angle of the wedge shape of the first groove or the second groove, may be set such that light diffracted in an adjacent groove toward a fourth direction perpendicular to both the first direction and the second direction interfere constructively.

The backlight unit may further comprise a light path change member located between the light source and the grating element.

The light source may comprise a first light source configured to emit light having a first wavelength, a second light source configured to emit light having a second wavelength different from the first wavelength, and a third light source configured to emit light having a third wavelength different from the first wavelength and the second wavelength.

The first light source, the second light source, and the third light source may be arranged such that incidence angles of light output from the first light source, the second light source, and the third light source, respectively, with respect to the grating element, are different from one another.

The light path change member may comprise a reflective surface that is a curved surface, and the first light source, the second light source, and the third light source irradiate the light beam in directions parallel to the light path change member.

The light source may be configured to provide monochromatic light.

The backlight unit may further comprise a wavelength conversion layer configured to convert a wavelength of light output from the grating element.

The wavelength conversion layer may comprise quantum dots.

The first beam expander may comprise a hologram device on which parallel light is recorded.

The hologram device may be configured such that parallel light of a plurality of types of monochromatic light is recorded on a hologram medium.

The hologram device may be configured such that a plurality of hologram media, on which parallel light of different types of monochromatic light are recorded, are stacked.

Parallel light of a type of monochromatic light may be recorded on the hologram device, and the hologram device further comprises a wavelength conversion layer that wavelength-converts light reproduced from the hologram device.

According to an aspect of an exemplary embodiment, there is provided a holographic display device comprising: a light source configured to provide a light beam; a first beam expander configured to: mix the light beam provided from the light source, expand the light beam in a first direction, and output the mixed and expanded light beam as white light; a second beam expander configured to: expand the white light emitted from the first beam expander in a second direction perpendicular to the first direction and output the expanded white light as surface light; a spatial light modulator configured to diffract incident light to reproduce a holographic image; and a field lens configured to focus the holographic image reproduced by the spatial light modulator to a space.

The holographic display device may further comprise a beam deflector configured to two-dimensionally control a position to which the holographic image is focused by the field lens.

The first beam expander may comprise a grating element comprising plurality of grooves arranged along a third direction inclined with respect to the first direction, each of the plurality of grooves having a wedge shape.

At least one of an interval between a first groove and a second groove, among the plurality of grooves, and an angle of the wedge shape of the first groove or the second groove, maybe set such that light diffracted in an adjacent groove toward a fourth direction perpendicular to both the first direction and the second direction interfere constructively.

The first beam expander may comprise a hologram device on which parallel light is recorded.

The holographic display device may further comprise an eye tracking sensor configured to sense a position of a viewer.

According to an aspect of an exemplary embodiment, there is provided a backlight unit comprising: a light source configured to output a first light, a second light and a third light, the first, the second and the third lights being different; a first beam expander configured to: mix the first light, the second light, and the third light output by the light source; expand the first light, the second light and the third light output by the light source in a first direction; output the mixed and expanded light beam as white light; and a second beam expander configured to: expand the white light emitted from the first beam expander in a second direction perpendicular to the first direction, and output the expanded white light as surface light.

The first light maybe red light, the second light maybe green light and the third light maybe blue light.

The first beam expander may comprise: a grating element comprising an inclined upper surface and a lower surface; wherein a plurality of grooves are arranged along the inclined upper surface, and wherein each of the plurality of grooves has a wedge shape.

According to an aspect of an exemplary embodiment, there is provided a beam expander comprising: a grating element comprising an inclined upper surface and a lower surface; wherein a plurality of grooves are arranged along the inclined upper surface, wherein each of the plurality of grooves has a wedge shape, and wherein the grating element is configured to output white light by mixing a light beam provided from a light source and expanding the light beam in a first direction.

The beam expander may further comprise: a light path change member provided on a side of the grating element facing the inclined upper surface and configured to redirect a light beam from a light source towards the plurality of grooves of the grating element.

The beam expander may further comprise: a wavelength conversion layer configured to convert a wavelength of light output from the grating element.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
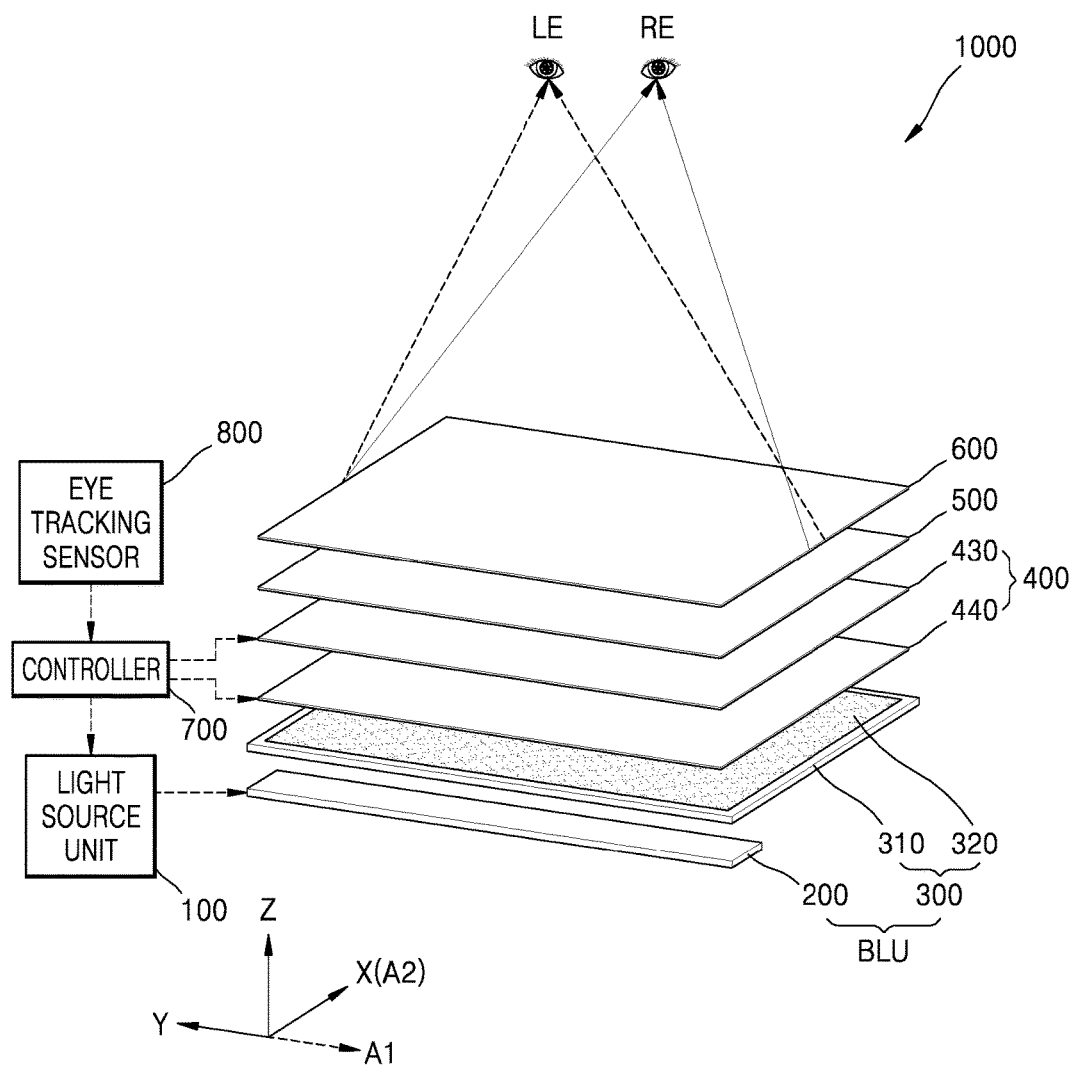
FIG. 1 is a perspective view illustrating a schematic structure of a holographic display device according to an exemplary embodiment of the present disclosure.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

Hereinafter, exemplary embodiments will be described with reference to the accompanying drawings. Throughout the drawings, like reference numerals refer to like elements, and each element may be exaggerated in size for clarity and convenience of description. Meanwhile, the following embodiments are merely illustrative, and various modifications may be possible from the exemplary embodiments.

An expression such as "above" or "on" may include not only the meaning of "immediately on in a contact manner", but also the meaning of "on in a non-contact manner".

Terms such as first, second, and the like may be used to describe various elements, but the elements should not be limited to those terms. These terms may be used for the purpose of distinguishing one element from another element.

The singular forms are intended to include the plural forms as well, unless the context clearly indicates otherwise. If it is assumed that a certain part includes a certain component, the term 'including' means that a corresponding component may further include other components unless a specific meaning opposed to the corresponding component is written.

The term "unit" or "module" used in the exemplary embodiments indicates a unit for processing at least one function or operation, and may be implemented in hardware, software, or in a combination of hardware and software.

FIG. 1 is a perspective view of a schematic structure of a holographic display device 1000 according to an exemplary embodiment.

The holographic display device 1000 may include a backlight unit BLU that provides light, and a spatial light modulator 600 that diffracts the light provided from the backlight unit BLU to reproduce a holographic image. A field lens 500 may be further provided between the backlight unit BLU and the spatial light modulator 600 to focus the holographic image reproduced by the spatial light modulator 600 to a predetermined space. A beam deflector 400 may be further provided to two-dimensionally control a traveling direction of a light beam from the backlight unit BLU. Although the field lens 500 is illustrated as being positioned between the beam deflector 400 and the spatial light modulator 600 in FIG. 1, the present disclosure is not limited thereto. The field lens 500 may be located, for example, in front of the spatial light modulator 600, such that the field lens 500 is positioned between the spatial light modulator 600 and a viewer.

The holographic display device 1000 may further include an eye tracking sensor 800 that senses a position of the viewer, and a controller 700 that controls the beam deflector 400 according to the position sensed by the eye tracking sensor 800. Further, the controller 700 may control the driving of a light source unit 100. For example, the controller 700 may time-sequentially control an irradiation direction of a light beam to time-sequentially form a holographic image in each of a left eye LE and a right eye RE of the viewer.

The holographic display device 1000 according to the exemplary embodiment provides holographic images having different viewpoints to the left eye LE and the right eye RE of a viewer in a binocular hologram technique. For example, the holographic display device 1000 provides a left-eye holographic image in a left-eye LE viewing zone of the viewer and a right-eye RE holographic image in a right-eye RE viewing zone of the viewer, the right-eye RE holographic image having a viewpoint different from that of the left-eye LE holographic image. Unlike a left-eye image and a right-eye image of a stereoscopic technique, the left-eye holographic image and the right-eye holographic image provided in the holographic display device 1000 may provide a cubic effect to the viewer alone and have different viewpoints. The stereoscopic technique provides a cubic effect using binocular parallax when a left-eye 2D image and a right-eye 2D image, which have different viewpoints, are perceived in the left eye and the right eye of a viewer, respectively. Thus, in the stereoscopic technique, a cubic effect is not generated by only one of the left-eye image and the right-eye image, and a sense of depth perceived in the brain and a focus of the eyes do not match, causing viewer fatigue. On the other hand, the holographic display device 1000 forms a left-eye holographic image and a right-eye holographic image in positions of a predetermined space, that is, in a left-eye LE viewing zone and a right-eye RE viewing zone, respectively, such that the sense of depth perceived in the brain and the focus of the eyes match, and complete parallax is provided. Since the holographic display device 1000 according to the exemplary embodiment provides only binocular viewpoints and the viewer may perceive only two viewpoints with the left eye LE and the right eye RE, data throughput may be reduced by removing other viewpoint information except for viewpoint information perceived by the viewer.

A detailed structure of the holographic display device 1000 will be described.

The backlight unit BLU may include a light source unit 100 that provides a light beam, a first beam expander 200 that mixes the light beam provided from the light source unit 100 and expands the light beam in a first direction A1, and a second beam expander 300 that expands the light emitted, e.g., output, from the first beam expander 200 in a second direction A2 and emits, e.g., outputs, the light as surface light.

The light source unit 100 may provide a light beam having coherence. The light source unit 100 may include a laser diode that generates light having high coherence. However, since light having some degree of spatial coherence may be sufficiently diffracted and modulated by the spatial light modulator 600, a light-emitting diode (LED) may be used. In addition to an LED, any light source emitting light having some degree of spatial coherence may be used.

The light source unit 100 may include a plurality of light sources emitting light of different wavelengths. For example, the light source unit 100 may include a first light source emitting light having a first wavelength, a second light source emitting light having a second wavelength different from the first wavelength, and a third light source emitting light having a third wavelength different from the first wavelength and the second wavelength. The light having the first wavelength, the light having the second wavelength, and the light having the third wavelength may be red, green, and blue, respectively.

The light source unit 100 may further include an optical member that shapes light irradiated from a light source into a light beam having a predetermined width. According to an exemplary embodiment, the light source unit 100 may further include the optical member, in addition to one or more of the plurality of light sources. The optical member may be, for example, a pinhole member, a collimating lens, or the like.

The first beam expander 200 expands a light beam provided from the light source unit 100 in a first direction A1. The first direction A1 may be a direction −Y shown in FIG. 1.

The first beam expander 200 mixes the light beam provided from the light source unit 100, expands the mixed light beam in the first direction A1, and emits, e.g., outputs, white light. To this end, the first beam expander 200 may include a grating element or a hologram device on which parallel light is recorded. A detailed example structure of the first beam expander 200 will be described in more detail with reference to FIGS. 2 through 13.

A second beam expander 300 expands the light beam expanded in the first direction A1 by the first beam expander 200. The second beam expander 300 expands the light beam in a second direction A2 that is perpendicular to the first direction A1, e.g., a direction X shown in the figures, to form surface light. The second beam expander 300 may include a light guide plate 310 that is formed of a transparent material and allows light travel in the second direction (the direction X) through total reflection, and an output coupler 320 that emits, e.g., outputs, light to the outside of the light guide plate 301. The output coupler 320 may be a diffractive optical element that diffracts and transmit a portion of light.

The beam deflector 400 may two-dimensionally control a traveling direction of the light beam emitted, e.g., output, from the backlight unit BLU. According to an exemplary embodiment, the beam deflector 400 may include a first beam deflector 440 and a second beam deflector 430. One of the first beam deflector 440 and the second beam deflector 430 may control a light beam in a horizontal direction, e.g., the direction Y, and the other controls a light beam in a vertical direction, e.g., the direction Z. A position on which a holographic image is focused may be adjusted by the beam deflector 400. In other words, a left-eye position to which a left-eye holographic image is focused and a right-eye position to which a right-eye holographic image is focused may be adjusted by the beam deflector 400. An interval between the left eye and the right eye, which is unique to an individual viewer, may be sensed by the eye tracking sensor 800. Also, changes in the left-eye position and the right-eye position due to movement of the viewer may be sensed by the eye tracking sensor 800. According to information sensed in this manner by the eye tracking sensor 800, the beam deflector 400 may control the traveling direction of the light beam.

According to an exemplary embodiment, one of the first beam deflector 440 and the second beam deflector 430 may be a liquid crystal deflector that diffracts incident light to generate two light beams traveling at different angles. According to an exemplary embodiment, when the beam deflector 400 spatially separates light at the same time to direct the light to the left eye and the right eye, time-sequential driving of the light source unit 100 is not needed.

The field lens 500 focuses the light which is direction-controlled by the beam deflector 400 to a predetermined space. The field lens 500 may include a Fresnel lens or a liquid crystal lens.

The light emitted from the backlight unit BLU and direction-controlled by the beam deflector 400 is incident to the spatial light modulator 600 through the field lens 500. The spatial light modulator 600 forms a hologram pattern having an interference pattern for modulating the incident light. The incident light is diffracted and modulated by the hologram pattern formed by the spatial light modulator 600, thus reproducing a holographic image at a position in a predetermined space.

Figure 2:
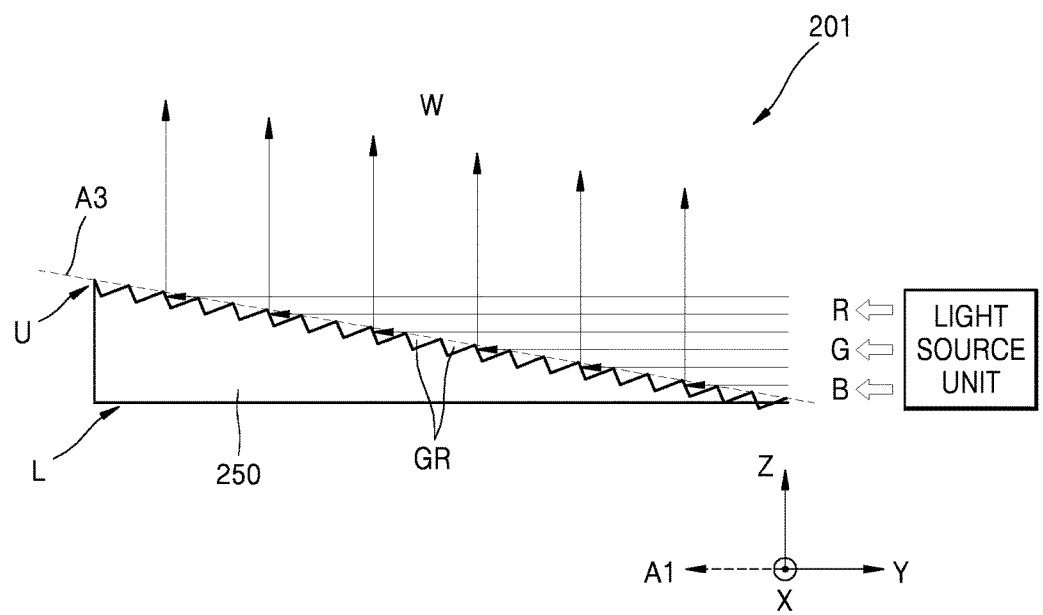
FIG. 2 is a cross-sectional view illustrating an example structure of a first beam expander provided in the holographic display device illustrated in FIG. 1 according to an exemplary embodiment.

FIG. 2 is a cross-sectional view illustrating an example structure of a first beam expander 201 provided in the holographic display device 1000 illustrated in FIG. 1.

The first beam expander 201 may be a grating element 250 including a plurality of grooves GRs in a wedge form, arranged along a direction. The direction may be a third direction A3 inclined with respect to the first direction A1. An angle between the first direction A1 and the third direction A3 may be an acute angle, i.e., greater than 0 degrees and less than 90°. Each of the plurality of grooves GR may have a cross-section that is perpendicular to the second direction A2 (direction X) and have a predetermined shape. That is, the groove GR may have a prism shape having a height along the direction X.

By arranging the grooves GRs along the third direction A3 inclined at a predetermined angle with respect to the first direction A1, the light beam incident in parallel with the first direction A1 is expanded in the first direction A1 and emitted along a fourth direction A4. The fourth direction A4, that is, a direction Z in the drawings, may be perpendicular to both the first direction A1 and the second direction A2. Light provided by a light source unit may be the red light R, the green light G, and the blue light B having a predetermined beam width. The incident red light R, green light G, and blue light B are diffracted in one of the grooves GRs of the grating element 250, and the diffracted light is directed in the fourth direction A4. Mixing of the red light R, the green light G, and the blue light B may occur at each position of the grooves GR, and the diffracted and emitted light may be white light W. Diffraction characteristics of the grating element 250 are related to a detailed shape of the grooves GR and the wavelength of the incident light. Even if angles at which the red light R, the green light G, and the blue light B are incident to the grooves GR, respectively, are equal, each of the red light R, the green light G, and the blue light B have different wavelengths, such that directions of diffracted light may be different. Thus, by making the angles at which each of the red light R, the green light G, and the blue light B are incident to the grooves GR different from one another, the directions of the diffracted light may coincide with each other. When the directions of the diffracted light coincide with each other, the red light R, the green light G, and the blue light B may be mixed to form the white light W. Such mixing may occur in every groove GR, such that light is expanded in the first direction A1 by the grating element 250 and mixed into white light, thus being emitted in the fourth direction A4.

Figure 3:
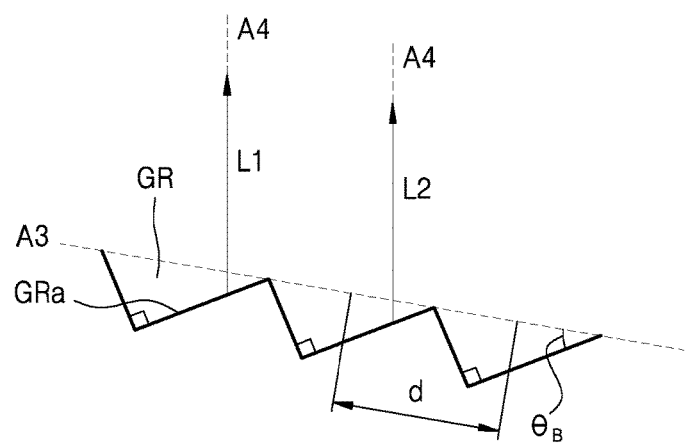
FIG. 3 is an enlarged view of a part of the first beam expander illustrated in FIG. 2 according to an exemplary embodiment.

FIG. 3 is an enlarged view of a part of FIG. 2.

The grooves GR may each have a wedge shape. The cross-sectional shape of one of the grooves GR may be, but not limited to, a triangular shape. The triangle of the cross-sectional shape of each of the grooves GR may be a triangle forming an angle $\theta_B$ between a groove surface GRa and the third direction A3 and having an angle of 90° in a center of each of the grooves GR. Two sides of the triangle that form a right angle may different lengths from each other. However, this is merely an example, and the present disclosure is not limited to this example. An interval d between the grooves GR is indicated by an arrangement period of the grooves GR, that is, a distance between the centers of the grooves GR. By adjusting the angle $\theta_B$ and the distance d between the grooves GR, the efficiency of diffracted light in a particular direction may be improved. The angle $\theta_B$ and the distance d may be set to cause diffracted light L1 and L2 directed in the fourth direction A4 by adjacent grooves GR to constructively interfere with each other, such that the diffracted light in the fourth direction A4 may be maximized. For example, to maximize the efficiency of the diffracted light directed in the fourth direction A4 with respect to light in a visible wavelength band incident in the first direction A1, angle $\theta_B$ may range from about 1° to about 46°, and distance d may range from about 0.4 µm to about 10 µm.

Figure 4:
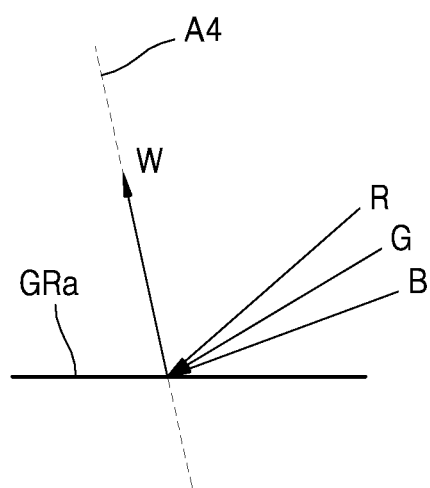
FIG. 4 is an enlarged view of a part of FIG. 2 for conceptually illustrating that light diffracted on a groove surface forms white light according to an exemplary embodiment.

FIG. 4 is an enlarged view of a part of FIG. 2 conceptually illustrating that light diffracted on the groove surface GRa forms white light.

As shown in FIG. 4, by making incidence angles of the red light R, the green light G, and the blue light B incident onto the groove surface GRa different from one another, directions of diffracted light in the fourth direction A4 may coincide with each other, and thus the white light W may be emitted along the fourth direction A4.

The shape of the grating element 250 shown in FIG. 2 is determined such that grooves are arranged along the third direction A3 inclined with respect to the first direction A1 in which the first beam expander 201 expands the light beam, and such that diffracted light is emitted in the fourth direction A4 perpendicular to the first direction A1 and the second direction A2. Thus, the grooves GR included in the grating element 250 are not limited to the shown shape and may have various shapes satisfying the above-described requirements. For example, the groove surface GRa is illustrated as a plane surface, but it may be a curved surface without being limited to this illustration.

According to an exemplary embodiment, the first beam 201 expander may include a grating element 250 having a lower surface (L) and an inclined upper surface (U). The grating element includes a plurality of grooves are arranged along the inclined upper surface. Also, each of the plurality of grooves may have a wedge shape.

Figure 5:
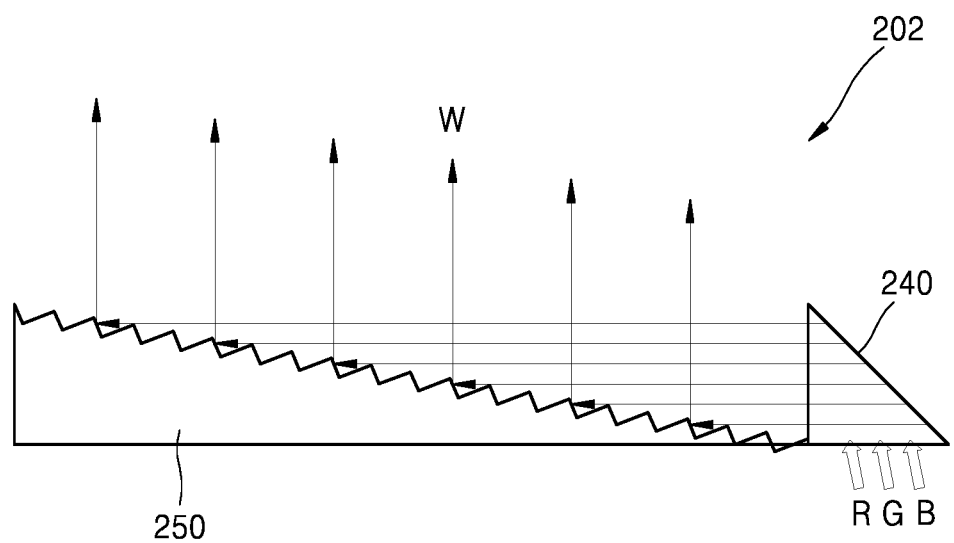
FIG. 5 is a cross-sectional view illustrating another example structure of a first beam expander provided in the holographic display device illustrated in FIG. 1 according to an exemplary embodiment.

FIG. 5 is a cross-sectional view illustrating another example structure of a first beam expander 202 provided in the holographic display device 1000 illustrated in FIG. 1.

The first beam expander 202 according to the exemplary embodiment illustrated in FIG. 5 is different from the first beam expander 201 of FIG. 2 in that a light path change member 240 is disposed between a light source unit and the grating element 250. The rest of the structure of the first beam expander 202 is substantially the same as the first beam expander 201 of FIG. 2.

The light path change member 240 may be a prism. The prism may include a reflective surface that is a plane surface. The light source unit 100 irradiates, at different angles toward the light path change member 240, the red light R, the green light G, and the blue light B which may then be reflected from a reflective surface having a specific inclination so as to be incident to the groove GR at different angles. Since the grooves GRs are designed such that light of different wavelengths is diffracted in different directions, the red light R, the green light G, and the blue light B incident at different angles are diffracted in an identical direction and are mixed, and thus, are emitted as the white light W.

According to another exemplary embodiment, the first beam expander may include a light path change member 240 provided on a side of the grating element facing the inclined upper surface (U) shown in FIG. 2, which redirects a light beam from a light source towards the plurality of grooves of the grating element.

Figure 6:
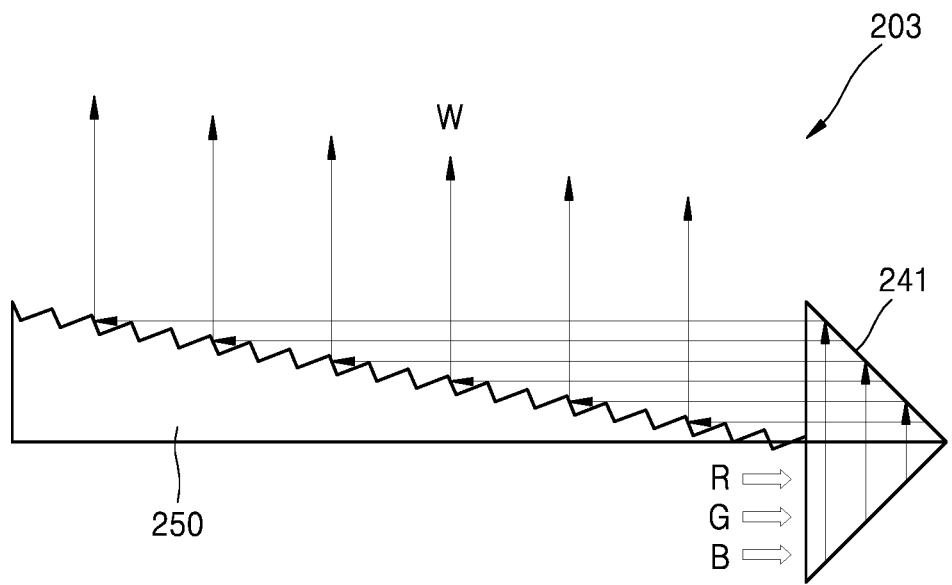
FIG. 6 is a cross-sectional view illustrating another example structure of a first beam expander provided in the holographic display device illustrated in FIG. 1 according to an exemplary embodiment.

FIG. 6 is a cross-sectional view illustrating another example structure of a first beam expander 203 provided in the holographic display device 1000 illustrated in FIG. 1.

The first beam expander 203 according to the exemplary embodiment illustrated in FIG. 6 is different from the first beam expander 202 of FIG. 5 in respect of the shape of a light path change member 241 disposed between a light source unit and the grating element 250. The rest of the structure of the first beam expander 203 is substantially the same as the first beam expander 203 of FIG. 5.

The light path change member 241 may be a prism having two reflective surfaces. According to such a shape of the light path change member 241, the light source unit may irradiate the red light R, the green light G, and the blue light B, in a direction almost parallel with the longitudinal direction of the grating element 250, toward the light path change member 241. That is, elements of the light source unit may be disposed parallel to the longitudinal direction of the grating element 250, thus reducing a thickness in the direction Z. As such, it can be seen from FIG. 1 that the backlight unit BLU may be configured to have a thin thickness. In FIG. 6, directions of the red light R, the green light G, and the blue light B incident to the light path change member 241 are illustrated as being parallel, but this illustration is provided for convenience, and angles at which the red light R, the green light G, and the blue light B are incident to the light path change member 241 may be made different such that they are incident to the grating element 250 at different angles.

Figure 7:
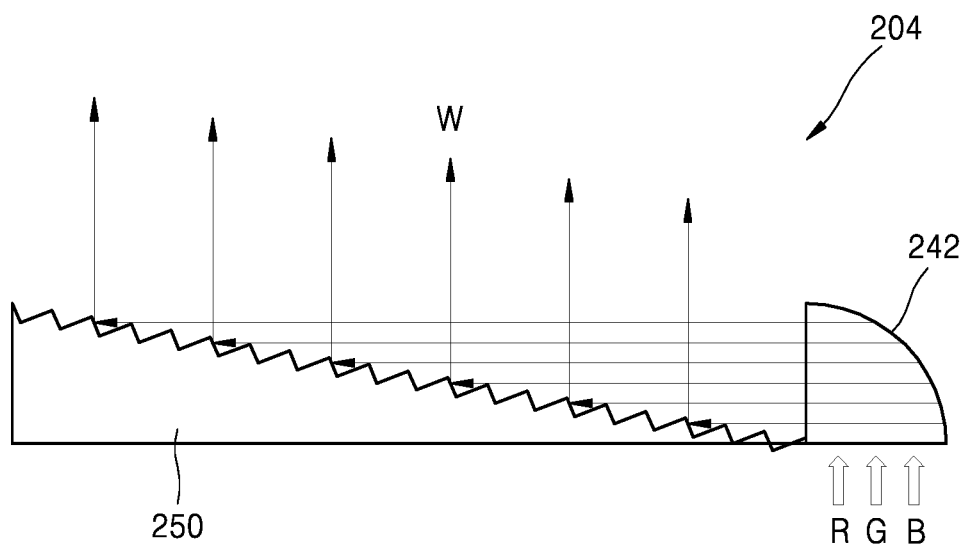
FIG. 7 is a cross-sectional view illustrating another example structure of a first beam expander provided in the holographic display device illustrated in FIG. 1 according to an exemplary embodiment.

FIG. 7 is a cross-sectional view illustrating another example structure of the first beam expander 204 provided in the holographic display device 1000 illustrated in FIG. 1.

The first beam expander 204 according to the exemplary embodiment illustrated in FIG. 7 is different from the first beam expander 202 of FIG. 5 in respect of the shape of a light path change member 242. The light path change member 242 may have a curved reflective surface. Although the curved surface is illustrated as being a spherical surface, it may have an aspherical shape. With such a shape of the light path change member 242, even if the red light R, the green light G, and the blue light B are incident to the light path change member 242 in the same direction, a reflective surface of the curved surface has a different inclination according to a position thereof, such that the red light R, the green light G, and the blue light B are incident to the grooves GR of the grating element 250 at different angles. Since the grooves GRs are designed such that directions of diffracted light are different for light of different wavelengths, the red light R, the green light G, and the blue light B incident at different angles are diffracted in an identical direction and are mixed, and thus are emitted as the white light W.

Figure 8:
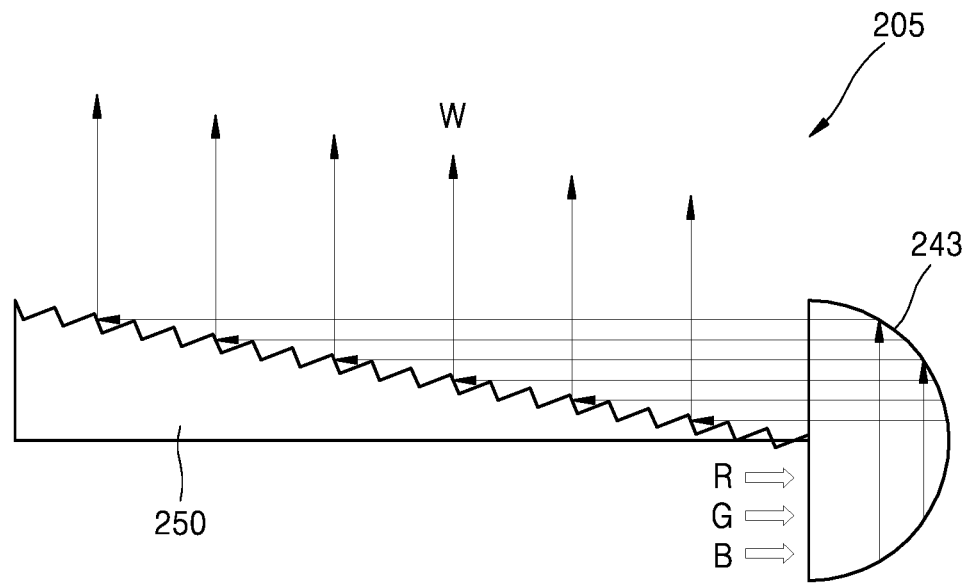
FIG. 8 is a cross-sectional view illustrating another example structure of a first beam expander provided in the holographic display device illustrated in FIG. 1 according to an exemplary embodiment.

FIG. 8 is a cross-sectional view illustrating another example structure of the first beam expander 205 provided in the holographic display device 1000 illustrated in FIG. 1.

The first beam expander 205 according to the exemplary embodiment illustrated in FIG. 8 is different from the first beam expander 204 of FIG. 7 in respect of the shape of a light path change member 243 disposed between a light source unit and the grating element 250. The rest of the structure of the first beam expander 205 is substantially the same as the first beam expander 204 of FIG. 7.

The light path change member 243 may be a prism having a reflective surface whose cross-section has a semicircular shape. The light source unit may irradiate the red light R, the green light G, and the blue light B, in directions almost parallel to the longitudinal direction of the grating element 250, toward the light path change member 243. That is, elements of the light source unit may be disposed in parallel to the longitudinal direction of the grating element 250, thus reducing a thickness in the direction Z. As such, it can be seen from FIG. 1 that the backlight unit BLU may be configured to have a thinner thickness than the first beam expander 204 of FIG. 7. Angles at which the red light R, the green light G, and the blue light B are incident to the light path change member 243 may be the same as each other. Similar to the embodiment described with reference to FIG. 7, even when the red light R, the green light G, and the blue light B are incident to the light path change member 243 in parallel, inclinations thereof differ according to a position on a curved surface, and thus the red light R, the green light G, and the blue light B meet the grating element 250 at different angles. Since the grooves GRs are designed such that directions of diffracted light are different for light of different wavelengths, the red light R, the green light G, and the blue light B incident at different angles are diffracted in an identical direction and are mixed, and are thus emitted as the white light W.

Figure 9:
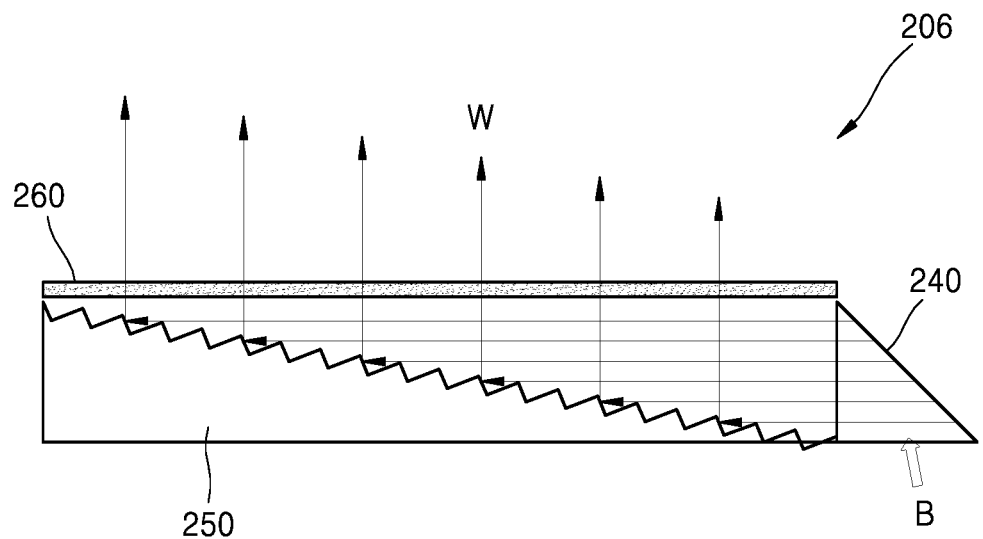
FIG. 9 is a cross-sectional view illustrating another example structure of a first beam expander provided in the holographic display device illustrated in FIG. 1 according to an exemplary embodiment.
Figure 10:
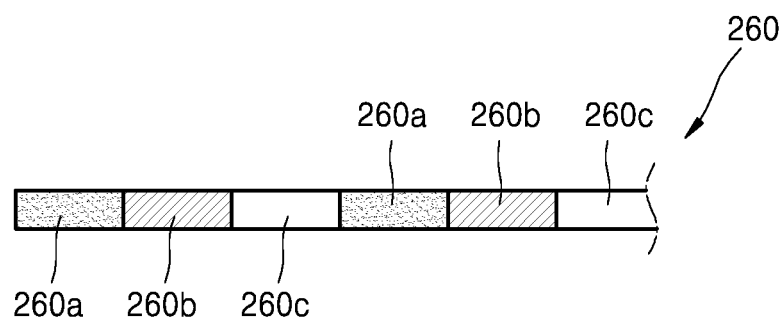
FIG. 10 is a cross-sectional view illustrating an example structure of a wavelength conversion layer provided in the first beam expander illustrated in FIG. 9 according to an exemplary embodiment.

FIG. 9 is a cross-sectional view illustrating another example structure of a first beam expander 206 provided in the holographic display device 1000 illustrated in FIG. 1, and FIG. 10 is a cross-sectional view illustrating an example structure of a wavelength conversion layer 260 provided in the first beam expander 206 illustrated in FIG. 9.

The first beam expander 206 according to the exemplary embodiment illustrated in FIG. 8 is different from the first beam expander 202 of FIG. 5 in that monochromatic light is irradiated to the grating element 250 and the wavelength conversion layer 260 is further provided in a light path along which diffracted light from the grating element 250 travels.

The light source unit may be configured to provide monochromatic light, e.g., the blue light B. The blue light B is path-changed by the light path change member 240, is directed to the grating element 250, and is diffracted by the groove GR and thus directed in the fourth direction A4.

The wavelength conversion layer 260 converts a wavelength of incident light into another wavelength. The wavelength conversion layer 260 may include, for example, quantum dots. A quantum dot may emit light of a wavelength longer than absorbed light, according to a material and a size thereof.

Referring to FIG. 10, the wavelength conversion layer 260 may be structured such that a first quantum dot layer 260a, a second quantum dot layer 260b, and a transparent layer 260c are repeatedly arrayed. A size and a material of quantum dots may be selected such that the first quantum dot layer 260a emits red light. A size and a material of quantum dots may be selected such that the second quantum dot layer 260b emits green light. The transparent layer 260c is formed of a transparent material passing incident light therethrough. By repetition of such an arrangement, light incident to the wavelength conversion layer 260 is emitted as red light, green light, and blue light according to a position thereof. A direction of light emitted from the first quantum dot layer 260a and the second quantum dot layer 260b may vary more as compared to an incidence direction due to scattering by quantum dots. Thus, the widths of the first quantum dot layer 260a, the second quantum dot layer 260b, and the transparent layer 260c are set to be narrow to the extent that light emitted from the first quantum dot layer 260a, the second quantum dot layer 260b, and the transparent layer 260c is mixed, such that the light passing through the wavelength conversion layer 260 may become the white light W.

The form of the wavelength conversion layer 260 is not limited to the form of FIG. 10. For example, the wavelength conversion layer 260 may be formed as a single layer where quantum dots emitting red light and quantum dots emitting green light are mixed. Alternatively, a layer including quantum dots emitting red light and a layer including quantum dots emitting green light may be stacked. A part of light incident to the wavelength conversion layer 260 may be converted into red light, another part may be converted into green light, and still another part may be emitted in a form in which a wavelength is not converted, such that they may be mixed into white light.

Figure 11:
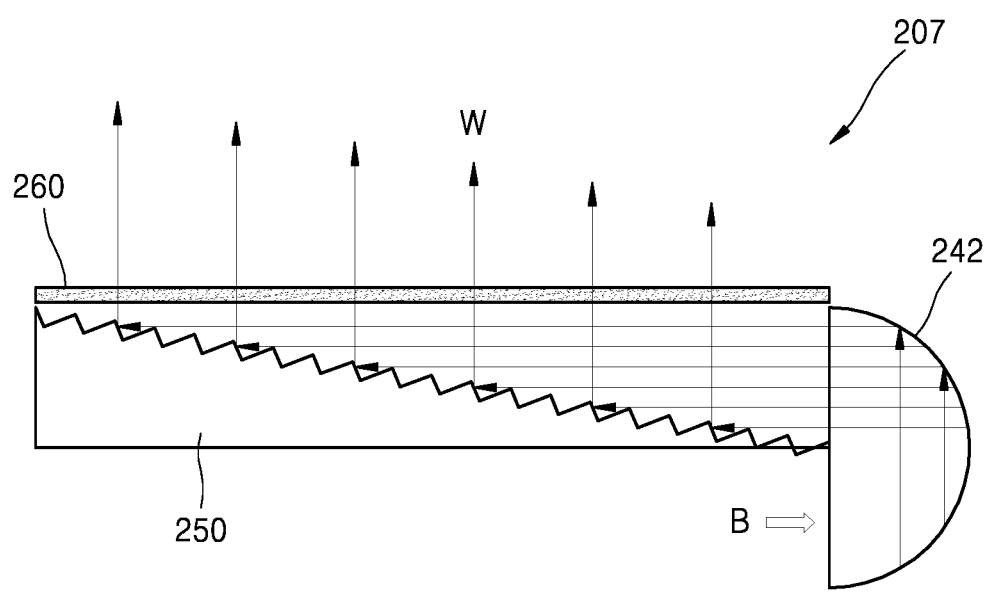
FIG. 11 is a cross-sectional view illustrating another example structure of a first beam expander provided in the holographic display device illustrated in FIG. 1 according to an exemplary embodiment.

FIG. 11 is a cross-sectional view illustrating another example structure of a first beam expander 207 provided in the holographic display device 1000 illustrated in FIG. 1.

The first beam expander 207 according to the exemplary embodiment illustrated in FIG. 11 is different from the first beam expander 206 of FIG. 9 in respect of the shape of a light path change member 242. The light path change member 242 may have a curved reflective surface. The reflective surface may have a semicircular cross-section. The light source unit provides the blue light B to the light path change member 242 in a direction parallel to the longitudinal direction of the grating element 250. The blue light B is path-changed by the light path change member 242 and is diffracted after meeting the grating element 250. Next, a part of the light is wavelength-converted into red light and another part of the light is wavelength-converted into green light in the wavelength conversion layer 260, thus emitting the overall white light W.

The first beam expander 206 of FIG. 9 and the first beam expander 207 of FIG. 11 may additionally include the wavelength conversion layer 260 in the first beam expander 202 of FIG. 5 and the first beam expander 205 of FIG. 8, respectively, but the present disclosure is not limited to this example. For example, the wavelength conversion layer 260 may be added to the first beam expander 203 of FIG. 6 and the first beam expander 204 of FIG. 7.

The first beam expanders 201, 202, 203, 204, 205, 206, and 207 described above have the grating element 250 of a reflective type, but the present disclosure is not limited to this example. The grating element 250 may be formed as a transmissive type, and accordingly, an arrangement of the light source unit may be changed.

The light path change members 240, 241, 242, and 243 of the first light beam expanders 202, 203, 204, 205, 206, and 207 are illustrated as being in a prism form having a plane surface or a curved surface, but the present disclosure is not limited to this example. For example, a mirror having a reflective surface that is a plane surface or a curved surface may be used.

In the grating element 250, details of a pattern of grooves having a wedge shape may be adjusted to improve the efficiency of diffracted light in a particular direction. The efficiency may be close to about 100%.

The first beam expanders 201, 202, 203, 204, 205, 206, and 207 described above may include the grating element 250, but are not limited thereto, and a hologram device on which a parallel light is recorded may be used for the first beam expander.

Figure 12:
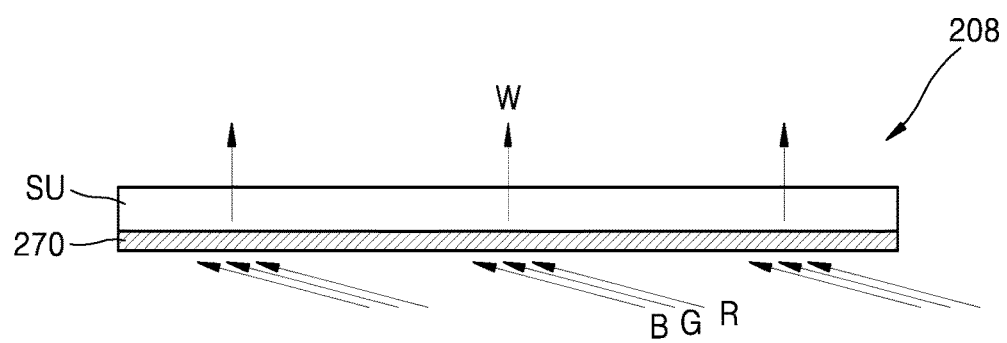
FIG. 12 is a cross-sectional view illustrating another example structure of a first beam expander provided in the holographic display device illustrated in FIG. 1.

FIG. 12 is a cross-sectional view illustrating another example structure of a first beam expander 208 provided in the holographic display device 1000 illustrated in FIG. 1.

The first beam expander 208 may include a hologram device on which a parallel light is recorded. The first beam expander 208 may include a transparent substrate SU and a hologram layer 270 formed on the transparent substrate SU. The hologram layer 270 may have a hologram pattern in which parallel light of a plurality types of monochromatic light is recorded on a hologram medium. Thus, if the same monochromatic light used for recording, e.g., the red light R, the green light G, and the blue light B, is irradiated onto the hologram layer 270, parallel light of the plurality of types of monochromatic light is reproduced from the hologram layer 270 and is mixed to form the white light W.

The hologram layer 270 is illustrated as a single layer, but the present disclosure is not limited thereto. For example, the hologram layer 270 may have a form in which a plurality of hologram media, on which parallel light of different types of monochromatic light are recorded, are stacked. When compared to a case where hologram patterns corresponding to parallel light of a plurality of types of monochromatic light are all included in a single layer, optical efficiency may be further improved when a stacked structure is used. In this case, the optical efficiency may be about 70% or more.

Figure 13:
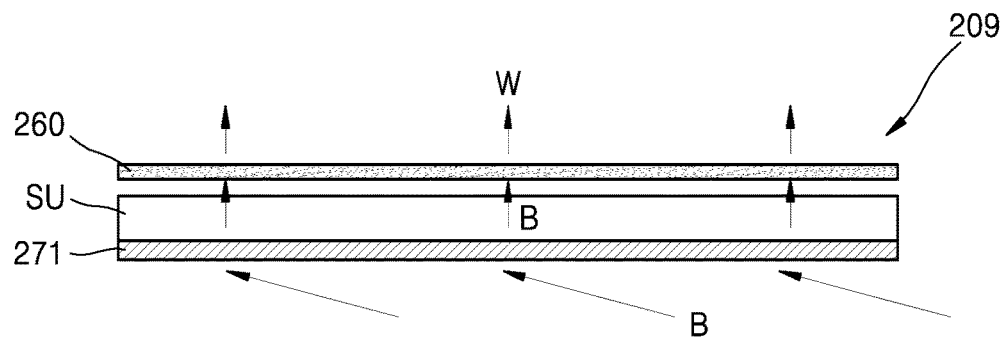
FIG. 13 is a cross-sectional view illustrating another example structure of a first beam expander provided in the holographic display device illustrated in FIG. 1 according to an exemplary embodiment.

FIG. 13 is a cross-sectional view illustrating another example structure of a first beam expander 209 provided in the holographic display device 1000 illustrated in FIG. 1.

The first beam expander 209 may include the transparent substrate SU, a hologram layer 271 formed on the transparent substrate SU, and the wavelength conversion layer 260 that converts a wavelength of incident light. The hologram layer 271 includes a hologram pattern corresponding to recording of parallel light of monochromatic light. Thus, if the monochromatic light used for recording, e.g., the blue light B, is irradiated onto the hologram layer 271, then parallel light is reproduced from the blue light B. A part of the blue light B incident to the wavelength conversion layer 260 is converted into red light and another part is converted into green light, such that the white light W is emitted.

The first beam expander 208 of FIG. 12 and the first beam expander 209 of FIG. 13 are transmissive-type hologram devices, but the present disclosure is not limited thereto. The hologram device may be implemented as a reflective type, and a position of a light source unit may be changed accordingly.

The above-described backlight unit provides a light beam having coherence, in the form of surface light, and converts the light beam into the surface light with high optical efficiency.

The holographic display device using the backlight unit consumes low power when forming a three-dimensional (3D) image.

While the backlight unit and the holographic display device including the same have been shown and described in connection with the exemplary embodiments, it will be apparent to those of ordinary skill in the art that modifications and variations can be made without departing from the spirit and scope of the embodiments as defined by the appended claims. Therefore, the exemplary embodiments of the present disclosure should be considered in an illustrative sense rather than a restrictive sense. The scope of the exemplary embodiments will be in the appended claims, and all of the differences in the equivalent range thereof should be understood to be included in the exemplary embodiments.

It should be understood that exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A backlight unit comprising:
a light source configured to provide a light beam;
a first beam expander configured to:
mix the light beam provided from the light source,
expand the light beam in a first direction, and
output the mixed and expanded light beam as white light; and
a second beam expander configured to:
expand the white light emitted from the first beam expander in a second direction perpendicular to the first direction, and
output the expanded white light as surface light,
wherein the first beam expander is configured to mix the light beam provided from the light source based on interference of diffracted light from the light beam to produce the white light.

2. The backlight unit of claim 1, wherein the first beam expander comprises a grating element comprising a plurality of grooves arranged along a third direction inclined with respect to the first direction, each of the plurality of grooves having a wedge shape.

3. The backlight unit of claim 2, wherein each of the plurality of grooves has a prism shape having a height in the second direction.

4. The backlight unit of claim 2, wherein at least one of an interval between a first groove and a second groove, among the plurality of grooves, and an angle of the wedge shape of the first groove or the second groove, is set such that light diffracted in an adjacent groove toward a fourth direction perpendicular to both the first direction and the second direction interfere constructively.

5. The backlight unit of claim 2, further comprising a light path change member located between the light source and the grating element.

6. The backlight unit of claim 5, wherein the light source comprises a first light source configured to emit light having a first wavelength, a second light source configured to emit light having a second wavelength different from the first wavelength, and a third light source configured to emit light having a third wavelength different from the first wavelength and the second wavelength.

7. The backlight unit of claim 6, wherein the first light source, the second light source, and the third light source are arranged such that incidence angles of light output from the first light source, the second light source, and the third light source, respectively, with respect to the grating element, are different from one another.

8. The backlight unit of claim 7, wherein the light path change member comprises a reflective surface that is a curved surface, and the first light source, the second light source, and the third light source irradiate the light beam in directions parallel to the light path change member.

9. The backlight unit of claim 2, wherein the light source is configured to provide monochromatic light.

10. The backlight unit of claim 9, further comprising a wavelength conversion layer configured to convert a wavelength of light output from the grating element.

11. The backlight unit of claim 10, wherein the wavelength conversion layer comprises quantum dots.

12. The backlight unit of claim 1, wherein the first beam expander comprises a hologram device on which parallel light is recorded.

13. The backlight unit of claim 12, wherein the hologram device is configured such that parallel light of a plurality of types of monochromatic light is recorded on a hologram medium.

14. The backlight unit of claim 12, wherein the hologram device is configured such that a plurality of hologram media, on which parallel light of different types of monochromatic light are recorded, are stacked.

15. The backlight unit of claim 12, wherein parallel light of a type of monochromatic light is recorded on the hologram device, and the hologram device further comprises a wavelength conversion layer that wavelength-converts light reproduced from the hologram device.

16. The backlight unit of claim 1, wherein the first beam expander comprises a grating element comprising a plurality of grooves configured to interfere light diffracted in an adjacent groove to produce white light.

17. The backlight unit of claim 1, wherein the first beam expander comprises a plurality of grooves, wherein an interval between a first groove and a second groove, among the plurality of grooves is set such that light diffracted in an adjacent groove toward a third direction perpendicular to both the first direction and the second direction interfere constructively.

18. A holographic display device comprising:
a light source configured to provide a light beam;
a first beam expander configured to:
mix the light beam provided from the light source,
expand the light beam in a first direction, and
output the mixed and expanded light beam as white light;
a second beam expander configured to:
expand the white light emitted from the first beam expander in a second direction perpendicular to the first direction and
output the expanded white light as surface light;
a spatial light modulator configured to diffract incident light to reproduce a holographic image; and
a field lens configured to focus the holographic image reproduced by the spatial light modulator to a space,
wherein the first beam expander is configured to mix the light beam provided from the light source based on interference of diffracted light from the light beam to produce the white light.

19. The holographic display device of claim 18, further comprising a beam deflector configured to two-dimensionally control a position to which the holographic image is focused by the field lens.

20. The holographic display device of claim 19, further comprising an eye tracking sensor configured to sense a position of a viewer.

21. The holographic display device of claim 18, wherein the first beam expander comprises a grating element comprising plurality of grooves arranged along a third direction inclined with respect to the first direction, each of the plurality of grooves having a wedge shape.

22. The holographic display device of claim 21, wherein at least one of an interval between a first groove and a second groove, among the plurality of grooves, and an angle of the wedge shape of the first groove or the second groove, is set such that light diffracted in an adjacent groove toward a fourth direction perpendicular to both the first direction and the second direction interfere constructively.

23. The holographic display device of claim 18, wherein the first beam expander comprises a hologram device on which parallel light is recorded.

24. A beam expander comprising:
a grating element comprising an inclined upper surface and a lower surface;
wherein a plurality of grooves are arranged along the inclined upper surface,
wherein each of the plurality of grooves has a wedge shape, and
wherein the grating element is configured to output white light by mixing a light beam provided from a light source and expanding the light beam in a first direction, and is configured to interfere light diffracted in an adjacent groove to produce the white light.

25. The beam expander of claim 24, further comprising:
a light path change member provided on a side of the grating element facing the inclined upper surface and configured to redirect a light beam from a light source towards the plurality of grooves of the grating element.

26. The beam expander of claim 24, further comprising:
a wavelength conversion layer configured to convert a wavelength of light output from the grating element.

* * * * *